Patented Jan. 19, 1937

2,067,894

UNITED STATES PATENT OFFICE 2,067,894

AROMATIC MERCURY SALTS OF AN OXYGEN ACID OF A HALOGEN

Carl N. Andersen, Wellesley Hills, Mass., assignor to Lever Brothers Company, a corporation of Maine No Drawing. Application April 18, 1935, Serial No. 17,061

11 Claims. (Cl. 260—13)

The present invention relates to certain new organic mercury compounds, more particularly aromatic mercury salts of the oxygen acids of the halogens, and it is an object of my invention to produce these new compounds.

I have discovered that when the acidic hydrogen of an oxygen acid of a halogen is replaced by the essential radical of certain aromatic mercury compounds, new compounds are produced. These aromatic mercury compounds are intended primarily for use as antiseptics and germicides but may find applications, in some instances, as explosives.

The compounds I have produced may be described as having the general formula $RHg.R_1$, in which R represents an aromatic structure, to a carbon atom of which the mercury is directly attached; and in which $R_1$ represents an acidic radical corresponding to an oxygen acid of a halogen, which radical is linked to the RHg group through the replacement of the acidic hydrogen atom.

More particularly, R represents an aromatic structure which may be an aromatic nucleus with or without side chains and the expression "aromatic structure" used herein is intended to be generic and include an aromatic nucleus, with or without side chains. The aromatic structure is of the type in which none of the nuclear or side chain carbon atoms has direct linkage with any element other than hydrogen, carbon or mercury. R may stand for the phenyl group, $C_6H_5$, or for an aromatic hydrocarbon having a nucleus similar to the phenyl hydrocarbons, as for example, polycyclic hydrocarbons, in which all of the nuclear carbon atoms, other than the one attached to mercury, and any side chain carbon atoms, have their valences satisfied either by carbon or hydrogen. Examples are the diphenyl, tolyl, xylyl, and naphthyl groups.

The radical $R_1$ may correspond to any of the oxygen acids of any of the halogens, especially chlorine, bromine and iodine.

I have prepared organic mercury salts corresponding to a number of the above noted acids. These compounds comprise a sufficiently representative number of the oxygen acids of the halogens to lead me to believe that all of the acids of this type can be employed to produce my novel mercury compounds. I, therefore, regard my invention as generic to and including the entire group of the oxygen acids of the halogens.

The general method of producing these compounds consists in reacting together the acid and a compound containing an aromatic mercury radical of the above mentioned type. A common solvent for both reacting components is employed. The compound resulting from the reaction is usually relatively insoluble as compared with the reacting components, and upon its precipitation may be filtered, washed and dried. In my application Serial No. 694,198, filed October 18, 1933, I have disclosed a method of preparing aromatic mercury compounds of this type by reacting an acidic compound with an aromatic mercury hydroxide. This reaction is one of neutralization of an acid and base to form a salt and water. This has the advantage that water is the only other product produced and the resulting compound may be easily purified. In my application Serial No. 694,199, filed October 18, 1933, I have disclosed another method of preparing aromatic mercury compounds of this type by employing a soluble aromatic mercury salt, for example, the acetate or lactate, in a reaction with the acidic compound. The aromatic mercury compounds produced are of a relatively low solubility as compared with the aromatic mercury salt and are relatively insoluble as compared with the acidic compound. Either of these methods may be employed in producing the compounds comprising this invention.

The following examples are given as illustrative of the method by which these compounds may be prepared and as illustrative of compounds falling within the scope of my invention:

Example 1

2.93 grams of phenylmercury hydroxide is dissolved in 500 cc. of water. The solution is filtered to remove any insoluble material. To the filtrate is added an excess of chloric acid (47.1 grams). The mixture is allowed to stand and white crystals precipitate. These may be separated by filtration, after which the crystals are washed and dried. The material melts at 190° C., and upon recrystallization from alcohol, it melts at 192–194° C. It is the compound phenylmercury chlorate.

Example 2

2.94 grams of phenylmercury hydroxide is treated with 10 cc. of dilute perchloric acid, specific gravity 1.54. The mixture is heated on a steam bath for a few minutes until the phenylmercury hydroxide dissolves. The solution is filtered rapidly and on cooling white crystals form. These are separated by filtration, washed well and dried in a vacuum desiccator. The material does not melt up to 250° C. and is the compound phenylmercury perchlorate.

*Example 3*

5 grams of barium bromate is treated with 2.4 grams of 100% sulfuric acid dissolved in 50 cc. of water. The bromic acid is separated by filtration and to the filtrate is added 7.35 grams of phenylmercury hydroxide. The mixture is heated on a steam bath for a few minutes until the phenylmercury hydroxide dissolves and the solution is then quickly filtered. A white insoluble residue forms and is separated from the solution by filtration, after which it is washed and dried. It melts at 165–174° C. and is the compound phenylmercury bromate.

*Example 4*

2.94 grams of phenylmercury hydroxide is dissolved in 100 cc. of water and heated until solution is complete. The solution is then filtered into a beaker containing 1.93 grams of iodic acid crystals. A white precipitate results and the mixture is stirred thoroughly to insure complete disintegration of the acid crystals. The mixture is allowed to cool and is then filtered. The precipitate is washed well with warm water to remove the excess of acid and with a few cc. of alcohol and dried. It sinters at 228° C. and is the compound phenylmercury iodate.

Theoretical quantities of materials may be generally employed, but in most instances a small excess of the acid is used in order to insure complete conversion of the aromatic mercury compound.

Any suitable solvent in which the reacting materials are soluble may be used as the medium for carrying out the reaction. When the reacting components are water soluble, which is usually the case, water is generally used for reasons of convenience, but other solvents, such as the alcohols, acetone, or mixture of these with each other, or with water, may be employed. The process may be carried out at any temperature, for example, room temperature. The use of heat, however, facilitates the solution of the reacting components and speeds the reaction.

From the description of the specific examples, it will be readily apparent to one skilled in the art how other aromatic mercury compounds of the above type may be prepared.

I claim:

1. A new organic compound of the general formula $RHg.R_1$, in which R represents an aromatic structure, to a carbon atom of which the mercury is directly attached and in which none of the carbon atoms has direct linkage with any element other than hydrogen, carbon and mercury; and in which $R_1$ represents a radical corresponding to an oxygen acid of a halogen, which radical is linked to an RHg group through the replacement of an acidic hydrogen atom.

2. A new organic compound of the general formula $RHg.R_1$, in which R represents an aromatic structure, to a carbon atom of which the mercury is directly attached and in which none of the carbon atoms has direct linkage with any element other than hydrogen, carbon and mercury; and in which $R_1$ represents a radical corresponding to an oxygen acid of chlorine, which radical is linked to an RHg group through the replacement of an acidic hydrogen atom.

3. A new organic compound of the general formula $RHg.ClO_3$, in which R represents an aromatic structure, to a carbon atom of which the mercury is directly attached and in which none of the carbon atoms has direct linkage with any element other than the hydrogen, carbon and mercury.

4. A new organic compound of the general formula $RHg.BrO_3$, in which R represents an aromatic structure, to a carbon atom of which the mercury is directly attached and in which none of the carbon atoms has direct linkage with any element other than the hydrogen, carbon and mercury.

5. A new organic compound of the general formula $RHg.IO_3$, in which R represents an aromatic structure, to a carbon atom of which the mercury is directly attached and in which none of the carbon atoms has direct linkage with any element other than the hydrogen, carbon and mercury.

6. A new organic compound of the general formula $C_6H_5Hg.R_1$, in which $R_1$ represents a radical corresponding to an oxygen acid of a halogen, which radical is linked to a $C_6H_5Hg$ group through the replacement of an acidic hydrogen atom.

7. A new organic compound of the general formula $C_6H_5Hg.R_1$, in which $R_1$ represents a radical corresponding to a higher oxygen acid of a halogen, which radical is linked to a $C_6H_5Hg$ group through the replacement of an acidic hydrogen atom.

8. A new organic compound of the general formula $C_6H_5Hg.R_1$, in which $R_1$ represents a radical corresponding to an oxygen acid of chlorine, which radical is linked to a $C_6H_5Hg$ group through the replacement of an acidic hydrogen atom.

9. Phenylmercury chlorate.
10. Phenylmercury bromate.
11. Phenylmercury iodate.

CARL N. ANDERSEN.